W. CLITES.
HEADLIGHT FOR VEHICLES.
APPLICATION FILED NOV. 22, 1910.

1,001,730.

Patented Aug. 29, 1911.

2 SHEETS—SHEET 1.

Witnesses

Inventor
William Clites
By
Attorney

W. CLITES.
HEADLIGHT FOR VEHICLES.
APPLICATION FILED NOV. 22, 1910.
1,001,730.
Patented Aug. 29, 1911.
2 SHEETS—SHEET 2.
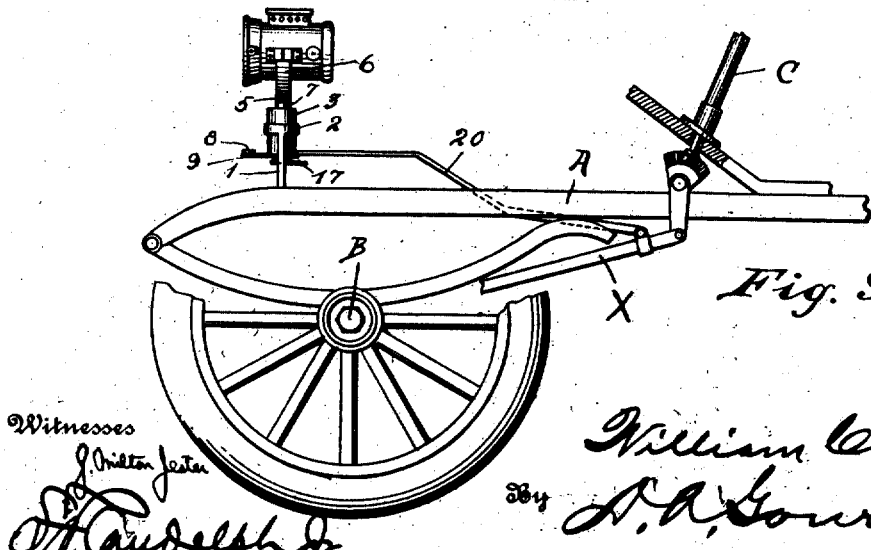

UNITED STATES PATENT OFFICE.

WILLIAM CLITES, OF ELLIOTT, IOWA.

HEADLIGHT FOR VEHICLES.

1,001,730.  Specification of Letters Patent.  Patented Aug. 29, 1911.

Application filed November 22, 1910. Serial No. 593,639.

*To all whom it may concern:*

Be it known that I, WILLIAM CLITES, a citizen of the United States, residing at Elliott, in the county of Montgomery and State of Iowa, have invented certain new and useful Improvements in Headlights for Vehicles, of which the following is a specification.

My invention relates to headlights for automobiles and the like and has for its object the provision of means for changing the position of the headlights whereby the movement of the steering gear of the vehicle will communicate motion to the light on the side of the vehicle toward which the vehicle is being steered to cause it to turn to throw its rays in the direction to be traveled, while the lamp on the far side remains stationary and throws its rays in a line with the frame of the car.

My invention will be described in detail hereinafter and illustrated in the accompanying drawings in which—

Figure 1:
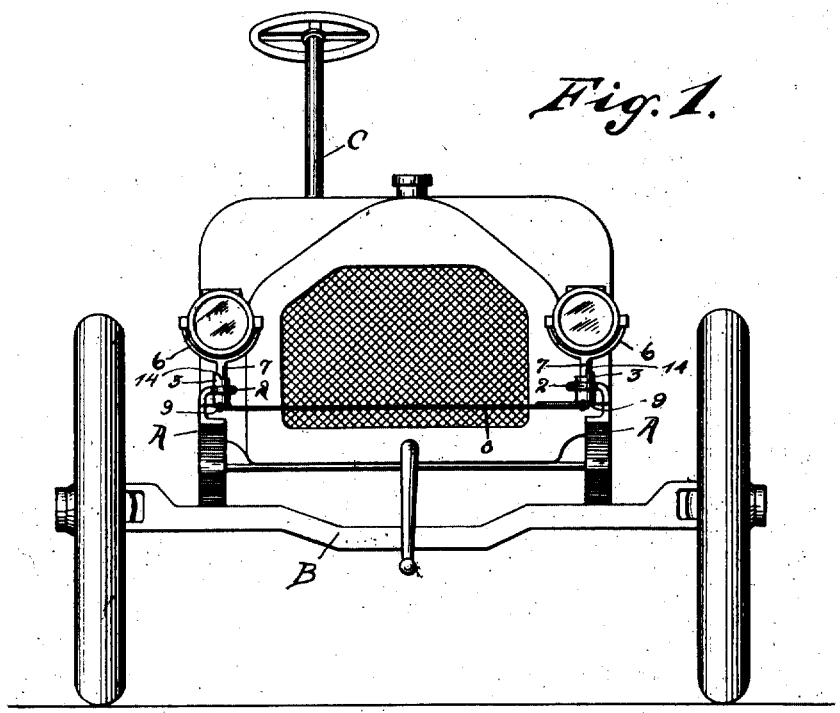
Figure 2:
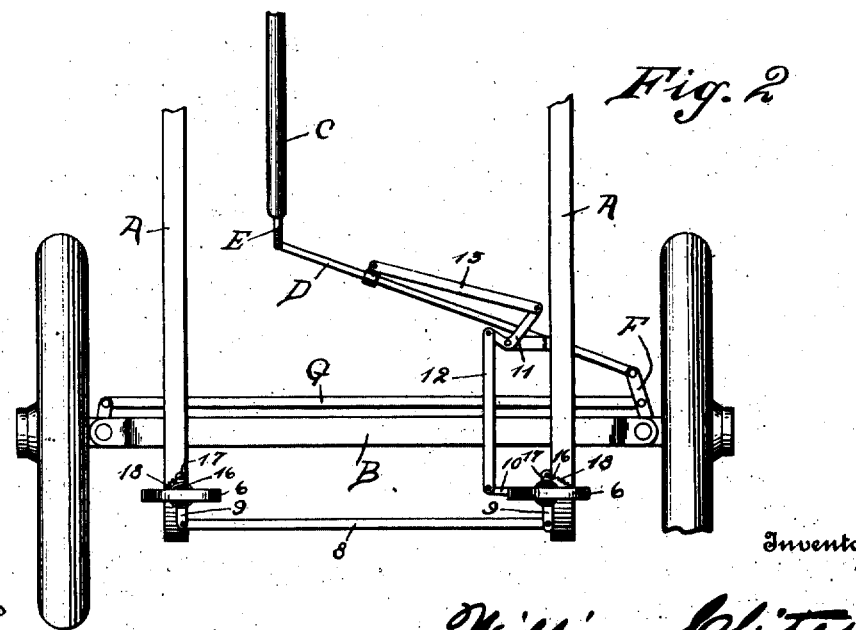

Figure 1 is a front view of a conventional automobile showing my improved lamps in position thereon, Fig. 2, a plan view of a fragment of the vehicle frame showing the lamp steering mechanism in position, Fig. 3, a side view of the left hand lamp support partly in section, Fig. 4, a front view, Fig. 5, a cross-section on the line 5—5 of Fig. 4, Fig. 6, a side view of the right hand lamp support partly in section, Fig. 7, a front view, Fig. 8, a cross-section on the line 8—8 of Fig. 7, Fig. 9, a side view showing the adaption of my lamp steering mechanism to a longitudinal steering rod for the wheels of the vehicle.

In the drawings similar reference characters indicate corresponding parts in the several views.

A indicates the side sills of a motor vehicle, B the front axle, C the steering post, D the steering rod connecting the steering arm E with an arm F secured to one of the wheel journals, G indicating the rod connecting the arms on the two wheel journals.

Secured to sills A are lamp brackets 1 having the semicircular arms 2 in which are secured the tubular mountings 3.

4 indicates tubular bushings revolubly mounted in tubular mountings 3, and 5 indicates the lamp holders having the arms 6 to receive the lamps and stems 7 revolubly mounted in bushings 4. The bushings 4 are secured together for simultaneous revolution by means of a rod 8 pivotally engaging arms 9 extending from the bushing. 10 indicates another arm extending from one of the bushings 4 and connected to one arm of bell-crank lever 11 by means of the rod 12, while the other arm of the lever is connected to steering rod D by means of rod 13.

Each tubular mounting 3 has its upper edge formed with an offset portion 14 and each bushing 4 is also formed with an offset 15 in its upper edge.

16 indicates a lateral lug or projection on each stem 7 that rides in the offset 14 of tubular mounting 3.

The offsets 14 and 15 and lugs or projections 16 are so arranged as shown on the drawings that when the wheel steering mechanism is operated to turn the vehicle toward the right the right hand lamp is turned in the same direction by the shoulder at the end of the offset 15 in bushing 4 engaging the lug or projection 16, while the bushing 4 in the left hand lamp support is turned so that the lug or projection 16 on the stem 7 of its lamp holder is not engaged by a shoulder on the bushing and the lamp remains stationary. When the steering mechanism is operated to turn the vehicle toward the left the left hand lamp is turned in the manner described above as to the right hand lamp and the right hand lamp remains stationary.

17 indicates an arm extending laterally from the lower end of each stem 7 and 18 springs secured to the arms 17 and to the frame of the vehicle to turn the lamp holders to the front and hold them in that position when the vehicle has completed its turning movement and is proceeding straight ahead again.

In Fig. 9 is shown a modified form of my lamp operating mechanism as applied to a vehicle employing a steering rod X extending longitudinally of the vehicle frame instead of transversely as shown in Fig. 2. In this structure the rod X is connected directly to one of the lamp supports by means of a rod 20 instead of the indirect connection required in the form shown in Fig. 2.

Having thus described my invention what I claim is—

1. In an operating mechanism for vehicle headlights, a tubular mounting suitably supported and having its upper edge formed with an offset, a tubular bushing revolubly mounted in the tubular mounting and having its upper end formed with an offset, a lamp holder having a stem revolubly mounted in the bushing, a lug on the stem and seated in the offsets aforesaid, said lug being adapted to engage the shoulder at one or the other end of offset on the bushing, and means to revolve the bushing.

2. In an operating mechanism for vehicle headlights, a tubular mounting suitably supported and having its upper edge formed with an offset, a tubular bushing revolubly mounted in the tubular mounting and having its upper end formed with an offset, a lamp holder having a stem revolubly mounted in the bushing, a lug on the stem and seated in the offsets aforesaid, said lugs being adapted to engage the shoulder at one or the other end of the offset on the bushing, means to revolve the bushing, an arm secured to the stem, and a spring secured at one end to the arm and having its other end suitably secured.

3. In combination with a vehicle having a wheel steering mechanism, a lamp bracket secured at each side thereof, a tubular mounting secured to each bracket and having an offset in its upper edge, said bushings being connected for simultaneous revolution, one of said bushings being operatively secured to the steering gear, lamp holders having stems revolubly mounted in the bushings, a lug on each stem and seated in the offsets on the mounting and bushing, said lugs being so arranged relative to the offsets in the bushings that movement of the steering gear operates to turn the lamp on the side toward which the vehicle is turned to throw its rays in advance of the turning vehicle, an arm extending laterally from each stem, and a spring secured to each arm and to the vehicle, said springs normally tending to hold the lamps so their rays are cast in a line with the frame of the vehicle.

In testimony whereof I hereto affix my signature in the presence of two witnesses.

WM. CLITES.

Witnesses:
R. E. HUMPHREY,
CHARLES E. REYNOLDS.